(12) United States Patent
Ashizawa et al.

(10) Patent No.: US 7,597,085 B2
(45) Date of Patent: Oct. 6, 2009

(54) DIRECT FUEL INJECTION-TYPE SPARK IGNITION INTERNAL COMBUSTION ENGINE

(75) Inventors: Takeshi Ashizawa, Yokohama (JP); Hiroshi Nomura, Gotenba (JP); Osamu Tomino, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 46 days.

(21) Appl. No.: 11/795,204

(22) PCT Filed: Nov. 16, 2006

(86) PCT No.: PCT/JP2006/323370

§ 371 (c)(1),
(2), (4) Date: Jul. 13, 2007

(87) PCT Pub. No.: WO2007/061020

PCT Pub. Date: May 31, 2007

(65) Prior Publication Data

US 2008/0135016 A1   Jun. 12, 2008

(30) Foreign Application Priority Data

Nov. 24, 2005   (JP) .............................. 2005-338815
Mar. 9, 2006    (JP) .............................. 2006-064281

(51) Int. Cl.
*F02B 31/04*   (2006.01)
*F02B 31/08*   (2006.01)

(52) U.S. Cl. ...................................... 123/301; 123/306

(58) Field of Classification Search ................ 123/301, 123/306, 305, 295, 302; 239/463, 468, 533.4
See application file for complete search history.

(56) References Cited

U.S. PATENT DOCUMENTS

| 5,813,385 | A  | * | 9/1998 | Yamauchi et al. | 123/276 |
| 5,941,207 | A  |   | 8/1999 | Anderson et al. | |
| 6,334,427 | B1 | * | 1/2002 | Nakayama et al. | 123/305 |
| 6,378,490 | B1 | * | 4/2002 | Ottowitz et al. | 123/305 |
| 6,418,905 | B1 | * | 7/2002 | Baudlot et al. | 123/301 |

FOREIGN PATENT DOCUMENTS

| JP | A-05-302561 | 11/1993 |
| JP | A-09-125964 | 5/1997 |
| JP | A-10-159568 | 6/1998 |
| JP | A-11-153034 | 6/1999 |
| JP | A-2000-161067 | 6/2000 |
| JP | A-2002-227651 | 8/2002 |
| JP | A-2002-327623 | 11/2002 |
| JP | A-2003-056351 | 2/2003 |
| JP | A-2003-120299 | 4/2003 |
| JP | A-2003-161154 | 6/2003 |

(Continued)

*Primary Examiner*—Mahmoud Gimie
(74) *Attorney, Agent, or Firm*—Oliff & Berridge, PLC

(57) ABSTRACT

When a homogeneous combustion is to be executed at a lean air-fuel ratio, a tumbling flow that whirls in the cylinder descending in the cylinder bore on the exhaust valve side and ascending in the cylinder bore on the intake valve side, is intensified by the fuel that is injected from the fuel injection valve toward the exhaust valve side in the cylinder bore in the last stage of the intake stroke.

9 Claims, 10 Drawing Sheets

FOREIGN PATENT DOCUMENTS

| | | |
|---|---|---|
| JP | A-2003-322022 | 11/2003 |
| JP | A-2004-019480 | 1/2004 |
| JP | A-2004-190548 | 7/2004 |
| JP | A-2004-232583 | 8/2004 |
| JP | A-2004-245203 | 9/2004 |
| JP | A-2005-180247 | 7/2005 |

* cited by examiner

DIRECT FUEL INJECTION-TYPE SPARK IGNITION INTERNAL COMBUSTION ENGINE

TECHNICAL FIELD

The present invention relates to a direct fuel injection-type spark ignition internal combustion engine.

BACKGROUND ART

In a homogeneous combustion by forming a homogeneous mixture in a cylinder and by igniting and burning the homogeneous mixture at an ignition timing in the last stage of the compression stroke, if a tumbling flow is formed in the cylinder by the intake air fed into the cylinder, disturbance due to the tumbling flow is made present in the cylinder at the ignition timing by sustaining the tumbling flow up to the ignition timing in the last stage of the compression stroke, and the combustion speed of the homogeneous mixture is increased by the disturbance, then a good homogeneous combustion can be realized.

In order to sustain the tumbling flow up to the ignition timing in the last stage of the compression stroke, there have been proposed direct fuel injection-type spark ignition internal combustion engines for forming a strong tumbling flow in a cylinder by arranging an intake flow control valve in the intake port and by feeding the intake air through the intake flow control valve into the cylinder along the upper wall of the intake port (see, for example, JP-A-2005-180247, JP-A-2004-190548 and JP-A-2002-227651).

In the above direct fuel injection-type spark ignition internal combustion engines, when the intake air is to be fed through the intake flow control valve into the cylinder along the upper wall of the intake port, the intake port is throttled by the intake flow control valve. Therefore, a strong tumbling flow can be formed in the cylinder without any particular problem when the required intake air amount is relatively small. When the required intake air amount becomes relatively large, however, the intake air becomes in short supply if the intake port is throttled by the intake flow control valve. Therefore, a strong tumbling flow cannot be formed in the cylinder by using the intake flow control valve.

In the homogeneous combustion in which the air-fuel ratio of a homogeneous mixture is leaner than the stoichiometric air-fuel ratio, the intake air is required in a relatively large amount. At this time, if a strong tumbling flow cannot be formed in the cylinder, the combustion speed becomes very slow and it becomes difficult to obtain a desired engine output.

Even when the homogeneous mixture has an air-fuel ratio which is the stoichiometric air-fuel ratio or a rich air-fuel ratio, it is desirable that the combustion speed is quickened by the disturbance in the cylinder. Namely, if a strong tumbling flow can be formed in the cylinder without the need of providing the intake flow control valve, then the engine intake system may not become complex.

It is therefore an object of the present invention to provide a direct fuel injection-type spark ignition internal combustion engine which is capable of forming, in the cylinders thereof, a strong tumbling flow which is sustained up to the ignition timing when a homogeneous combustion is executed at an air-fuel ratio leaner than the stoichiometric air-fuel ratio and to provide a direct fuel injection-type spark ignition internal combustion engine which is capable of forming, in the cylinders thereof, a strong tumbling flow without the need of using intake flow control valves.

DISCLOSURE OF THE INVENTION

A direct fuel injection-type spark ignition internal combustion engine of the present invention described in claim 1 comprises a fuel injection valve arranged nearly at the center in the upper part of the cylinder, and an ignition plug arranged at the upper part of the cylinder, wherein when a homogeneous combustion is to be executed at an air-fuel ratio leaner than the stoichiometric air-fuel ratio, a tumbling flow that whirls in the cylinder descending in the cylinder bore on the exhaust valve side and ascending in the cylinder bore on the intake valve side, is intensified by the fuel that is injected from the fuel injection valve toward the exhaust valve side in the cylinder bore in the last stage of the intake stroke.

A direct cylinder fuel injection-type spark ignition internal combustion engine of the invention described in claim 2 is the direct fuel injection-type spark ignition internal combustion engine described in claim 1, wherein the ignition plug is arranged on the intake valve side away from the fuel injection valve.

A direct fuel injection-type spark ignition internal combustion engine of the invention described in claim 3 is the direct fuel injection-type spark ignition internal combustion engine described in claim 1, wherein the fuel injection valve injects the fuel into a space positioned between the two intake valves in parallel with a longitudinal plane that passes through the center axis of the cylinder in parallel with the tumbling flow.

A direct fuel injection-type spark ignition internal combustion engine of the invention described in claim 4 is the direct fuel injection-type spark ignition internal combustion engine described in claim 1, wherein the ignition plug is so arranged that the direction of width of the plate electrode of the ignition plug is nearly in parallel with the tumbling flow.

A direct fuel injection-type spark ignition internal combustion engine of the invention described in claim 5 is the direct fuel injection-type spark ignition internal combustion engine described in claim 1, wherein the ignition energy of the ignition plug is increased with an increase in the intensity of the tumbling flow at the ignition timing.

A direct fuel injection-type spark ignition internal combustion engine of the invention described in claim 6 is the direct fuel injection-type spark ignition internal combustion engine described in claim 1, wherein the fuel injection valve injects a required amount of fuel, in which the fuel injection is divided into a plurality of times.

A direct fuel injection-type spark ignition internal combustion engine of the invention described in claim 7 is the direct fuel injection-type spark ignition internal combustion engine described in claim 1, wherein the top surface of a piston is provided with a protuberance that deflects the tumbling flow traveling along the top surface of the piston so as to ascend in the cylinder bore on the intake valve side.

A direct fuel injection-type spark ignition internal combustion engine of the invention described in claim 8 is the direct fuel injection-type spark ignition internal combustion engine described in claim 1, wherein a cavity is formed in the top surface of the piston to suppress the attenuation of the tumbling flow.

A direct fuel injection-type spark ignition internal combustion engine of the invention described in claim 9 is the direct fuel injection-type spark ignition internal combustion engine described in claim 8, wherein the ignition plug is arranged on the exhaust valve side away from the fuel injection valve, the cavity is deviated toward the exhaust valve side in the top surface of the piston, and an ignition gap of the ignition plug is positioned near the center axis of the cavity at the ignition timing.

A direct fuel injection-type spark ignition internal combustion engine of the invention described in claim 10 is the direct fuel injection-type spark ignition internal combustion engine described in claim 8, wherein the cavities are formed corresponding to the two tumbling flows so as to suppress the attenuation of the two tumbling flows formed in the cylinder through two intake valves, a bulging portion is formed on the top surface of the piston between the two cavities, the ignition plug is so arranged that the ignition gap thereof faces the top surface of the bulging portion, and the two tumbling flows that whirl in the cylinder descending in the cylinder bore on the exhaust valve side and ascending in the cylinder bore on the intake valve side, are intensified by the fuel that is injected from one or a plurality of fuel injection valves toward the exhaust valve side in the cylinder bore in the last stage of the intake stroke.

A direct fuel injection-type spark ignition internal combustion engine of the invention described in claim 11 is the direct fuel injection-type spark ignition internal combustion engine described in claim 8, wherein the bulging portions are formed on the top surface of the piston on both sides of the cavity, and two ignition plugs are so arranged that ignition gaps thereof face the top surfaces of the two bulging portions, respectively.

A direct fuel injection-type spark ignition internal combustion engine of the present invention described in claim 12 comprises a fuel injection valve arranged nearly at the center in the upper part of the cylinder, and an ignition plug arranged at the upper part of the cylinder, wherein the most part of the injected fuel is directed to a one-fifth portion on the lower side of the cylinder bore wall on the exhaust valve side in the last stage of the intake stroke, so that a tumbling flow that whirls in the cylinder descending in the cylinder bore on the exhaust valve side and ascending in the cylinder bore on the intake valve side, is intensified by the fuel that is injected from the fuel injection valve toward the exhaust valve side in the cylinder bore in the last stage of the intake stroke.

A direct fuel injection-type spark ignition internal combustion engine of the invention described in claim 13 is the direct fuel injection-type spark ignition internal combustion engine described in claim 12, wherein the fuel injection valve has a slit injection hole of a partly arcuate shape, and the horizontal sectional shape of the fuel injected from the fuel injection valve is nearly symmetrical relative to the central vertical plane of the cylinder in parallel with the direction of whirl of the tumbling flow and is a partly arcuate shape being curved inward of the cylinder bore.

A cylinder fuel injection-type spark ignition internal combustion engine of the invention described in claim 14 is the direct fuel injection-type spark ignition internal combustion engine described in claim 13, wherein the partly arcuate shape is a semi-arcuate shape.

A direct fuel injection-type spark ignition internal combustion engine of the invention described in claim 15 is the direct fuel injection-type spark ignition internal combustion engine described in claim 12, wherein the fuel injection valve has a slit injection hole of the shape of a polygonal line, and the horizontal sectional shape of the fuel injected from the fuel injection valve is nearly symmetrical relative to the central vertical plane of the cylinder in parallel with the direction of whirl of the tumbling flow and is of the shape of a line having a contained angle not larger than 180° inward of the cylinder bore.

A direct fuel injection-type spark ignition internal combustion engine of the invention described in claim 16 is the direct fuel injection-type spark ignition internal combustion engine described in claim 12, wherein the fuel injection valve has a plurality of round injection holes, and the horizontal sectional shape of the fuel injected from the fuel injection valve is nearly symmetrical relative to the central vertical plane of the cylinder in parallel with the direction of whirl of the tumbling flow and forms a plurality of nearly round shapes aligned in a partly arcuate shape being curved inward of the cylinder bore.

A direct fuel injection-type spark ignition internal combustion engine of the invention described in claim 17 is the direct fuel injection-type spark ignition internal combustion engine described in claim 12, wherein the fuel injection valve has a plurality of round injection holes, and the horizontal sectional shape of the fuel injected from the fuel injection valve is nearly symmetrical relative to the central vertical plane of the cylinder in parallel with the direction of whirl of the tumbling flow and forms a plurality of nearly round shapes aligned like a line having a contained angle of not larger than 180° inward of the cylinder bore.

A direct fuel injection-type spark ignition internal combustion engine of the invention described in claim 18 is the direct fuel injection-type spark ignition internal combustion engine described in claim 12, wherein the fuel injected from the fuel injection valve has such a piercing force that the end of fuel 1 ms after the start of injection reaches not less than 60 mm from the injection hole of the fuel injection valve, and has a Sauter mean diameter of not larger than 15 μm at a position 60 mm from the injection hole of the fuel injection valve 2 ms after the start of injection.

A direct fuel injection-type spark ignition internal combustion engine of the invention described in claim 19 is the direct fuel injection-type spark ignition internal combustion engine described in claim 18, wherein the fuel injected from the fuel injection valve has such a piercing force that the end of fuel 1 ms after the start of injection reaches not less than 100 mm from the injection hole of the fuel injection valve, and has a Sauter mean diameter of not larger than 9 μm at a position 100 mm from the injection hole of the fuel injection valve 2 ms after the start of injection.

According to the direct fuel injection-type spark ignition internal combustion engine of the present invention described in claim 1, when a homogeneous combustion is to be executed at an air-fuel ratio leaner than the stoichiometric air-fuel ratio, a tumbling flow that whirls in the cylinder descending in the cylinder bore on the exhaust valve side and ascending in the cylinder bore on the intake valve side, is intensified by the fuel that is injected from the fuel injection valve arranged nearly at the center in the upper part of the cylinder toward the exhaust valve side in the cylinder bore in the last stage of the intake stroke. Therefore, when the homogeneous combustion is executed at an air-fuel ratio leaner than the stoichiometric air-fuel ratio, the tumbling flow is reliably sustained up to the ignition timing so that the disturbance is present in the cylinder, enabling the combustion speed to be relatively increased and making it possible to reliably obtain a desired engine output.

According to the direct fuel injection-type spark ignition internal combustion engine of the invention described in claim 2 which is concerned to the direct fuel injection-type spark ignition internal combustion engine described in claim 1, the ignition plug is arranged on the intake valve side away from the fuel injection valve that injects fuel toward the exhaust valve side in the cylinder bore, so that the fuel injected from the fuel injection valve will not directly collide with the ignition plug. Accordingly, the ignition plug is not wet with the fuel, and the generation of arc is not hindered.

According to the direct fuel injection-type spark ignition internal combustion engine of the invention described in claim 3, in the direct fuel injection-type spark ignition internal combustion engine described in claim 1, the fuel injection valve injects the fuel into a space positioned between the two intake valves in parallel with a longitudinal plane that passes through the center axis of the cylinder in parallel with the tumbling flow. The thus injected fuel travels through the space chiefly between the two intake valves as it whirls in the cylinder together with the tumbling flow, and hardly deposits on the intake valve that is being opened. This suppresses the reduction in the intake air amount caused by the deposition on the intake valve.

According to the direct fuel injection-type spark ignition internal combustion engine of the invention described in claim 4, in the direct fuel injection-type spark ignition internal combustion engine described in claim 1, the ignition plug is so arranged that the direction of width of the plate electrode of the ignition plug is nearly in parallel with the tumbling flow. This suppresses the attenuation of the tumbling flow caused by the plate electrode of the ignition plug, and the tumbling flow is reliably sustained up to the ignition timing.

According to the direct fuel injection-type spark ignition internal combustion engine of the invention described in claim 5, in the direct fuel injection-type spark ignition internal combustion engine described in claim 1, the ignition energy of the ignition plug is increased with an increase in the intensity of the tumbling flow at the ignition timing. Therefore, the arc is not extinguished by a too strong turbulence that is present at the ignition timing due to the tumbling flow, or the arc does not break even if it is drawn by the tumbling flow.

According to the direct fuel injection-type spark ignition internal combustion engine of the invention described in claim 6, in the direct fuel injection-type spark ignition internal combustion engine described in claim 1, the fuel injection valve injects a required amount of fuel, in which the fuel injection is divided into a plurality of times. Therefore, the intensity of the tumbling flow can be varied by adjusting the amount of fuel injection in the last stage of the intake stroke.

According to the direct fuel injection-type spark ignition internal combustion engine of the invention described in claim 7, in the direct fuel injection-type spark ignition internal combustion engine described in claim 1, the top surface of a piston is provided with a protuberance that deflects the tumbling flow traveling along the top surface of the piston so as to ascend in the cylinder bore on the intake valve side, suppressing the attenuation of the tumbling flow and enabling the tumbling flow to be easily sustained up to the ignition timing.

According to the direct fuel injection-type spark ignition internal combustion engine of the invention described in claim 8, in the direct fuel injection-type spark ignition internal combustion engine described in claim 1, a cavity is formed in the top surface of the piston to suppress the attenuation of the tumbling flow making it possible to easily sustain the tumbling flow up to the ignition timing.

According to the direct fuel injection-type spark ignition internal combustion engine of the invention described in claim 9, in the direct fuel injection-type spark ignition internal combustion engine described in claim 8, the ignition plug is arranged on the exhaust valve side away from the fuel injection valve, the cavity for suppressing the attenuation of tumbling flow is deviated toward the exhaust valve side in the top surface of the piston, and an ignition gap of the ignition plug is positioned near the center axis of the cavity at the ignition timing. Therefore, the tumbling flow is easily sustained up to the ignition timing due to the cavity, the mixture in the cavity starts burning from near the center thereof due to the arc generated in the ignition gap of the ignition plug, the flame thereof radially propagates to the outer periphery thereof and, finally, the outer periphery burns nearly simultaneously. Therefore, the flame propagation distance until the completion of combustion becomes relatively short, and the combustion speed increases.

According to the direct fuel injection-type spark ignition internal combustion engine of the invention described in claim 10, in the direct fuel injection-type spark ignition internal combustion engine described in claim 8, the cavities are formed corresponding to the two tumbling flows so as to suppress the attenuation of the two tumbling flows formed in the cylinder through two intake valves, and the two tumbling flows are, respectively, intensified by the fuel injected in the last stage of the intake stroke and are sustained up to the ignition timing. Further, a bulging portion is formed on the top surface of the piston between the two cavities, and the ignition plug is so arranged that the ignition gap thereof faces the top surface of the bulging portion. The bulging portion works to increase the compression ratio, the mixture in the cylinder starts slowly burning from a relatively narrow space between the ignition plug and the top surface of the bulging portion due to the arc generated in the ignition gap of the ignition plug, and the flame thereof propagates into the cavities on both sides of the bulging portion finally triggering a rapid combustion, producing little knocking.

According to the direct fuel injection-type spark ignition internal combustion engine of the invention described in claim 11, in the direct fuel injection-type spark ignition internal combustion engine described in claim 8, the bulging portions are formed on the top surface of the piston on both sides of the cavity, and two ignition plugs are so arranged that ignition gaps thereof face the top surfaces of the two bulging portions, respectively. Namely, the two bulging portions increase the compression ratio, the mixture in the cylinder starts slowly burning from the two relatively narrow spaces between the ignition plugs and the top surfaces of the bulging portions due to the arcs generated in the ignition gaps of the ignition plugs, and the two flames thereof propagate into the cavity between the two bulging portions from both sides thereof finally triggering a very rapid combustion. Therefore, the combustion speed can be increased producing little knocking.

According to the direct fuel injection-type spark ignition internal combustion engine of the present invention described in claim 12, most of the injected fuel is directed to a one-fifth portion of the lower side of the cylinder bore wall on the exhaust valve side in the last stage of the intake stroke, so that a tumbling flow that whirls in the cylinder descending in the cylinder bore on the exhaust valve side and ascending in the cylinder bore on the intake valve side, is intensified by the fuel that is injected from the fuel injection valve arranged nearly at the center in the upper part of the cylinder toward the exhaust valve side in the cylinder bore in the last stage of the intake stroke. With the fuel being injected aslant and downward toward the exhaust valve side in the cylinder bore from the fuel injection valve arranged nearly at the center in the upper part of the cylinder, the piercing force of the injected fuel intensifies the tumbling flow that is moving aslant and downward along the exhaust valve side of the pent roof-type cylinder head, and the component of the piercing force of the injected fuel in the vertical direction intensifies the tumbling flow that is descending in the vertical direction along the cylinder bore. With most of the fuel injected aslant and downward being directed to one-fifth portion of the lower side of the cylinder bore wall on the exhaust valve side in the last stage of the intake stroke, the injected fuel favorably works to intensify the tumbling flow over a long distance until arriving at the cylinder bore wall. Besides, while traveling over a long distance, the injected fuel vaporizes just before arriving at the cylinder bore wall and hardly deposits on the cylinder bore wall. Therefore, the engine oil is hardly diluted, and there is almost no increase in the amount of the unburned fuel in the exhaust gas that stems from the vaporization of the deposited fuel.

According to the direct fuel injection-type spark ignition internal combustion engine of the invention described in claim 13, in the direct fuel injection-type spark ignition internal combustion engine described in claim 12, the fuel injection valve has a slit injection hole of a partly arcuate shape, and the horizontal sectional shape of the fuel injected from the fuel injection valve is nearly symmetrical relative to the central vertical plane of the cylinder in parallel with the direction of whirl of the tumbling flow and is a partly arcuate shape being curved inward of the cylinder bore. Most of the injected fuel having the above sectional shape can be easily directed to one-fifth portion on the lower side of the cylinder bore wall on the exhaust valve side in the last stage of the intake stroke, and is used to favorably intensity the tumbling flow over a predetermined width with the central vertical plane of the cylinder as a center.

According to the direct fuel injection-type spark ignition internal combustion engine of the invention described in claim 14 which is concerned to the direct fuel injection-type spark ignition internal combustion engine described in claim 13, the partly arcuate shape is a semi-arcuate shape. Therefore, the tumbling flow can be favorably intensified over the full width thereof by the injected fuel.

According to the direct fuel injection-type spark ignition internal combustion engine of the invention described in claim 15, in the direct fuel injection-type spark ignition internal combustion engine described in claim 12, the fuel injection valve has a slit injection hole of the shape of a polygonal line, and the horizontal sectional shape of the fuel injected from the fuel injection valve is nearly symmetrical relative to the central vertical plane of the cylinder in parallel with the direction of whirl of the tumbling flow and is of the shape of a line having a narrow angle not larger than 180° inward of the cylinder bore. Most of the injected fuel having the above sectional shape can be easily directed to one-fifth portion on the lower side of the cylinder bore wall on the exhaust valve side in the last stage of the intake stroke, and is used to favorably intensify the tumbling flow over a predetermined width with the central vertical plane of the cylinder as a center.

According to the direct fuel injection-type spark ignition internal combustion engine of the invention described in claim 16, in the direct fuel injection-type spark ignition internal combustion engine described in claim 12, the fuel injection valve has a plurality of round injection holes, and the horizontal sectional shape of the fuel injected from the fuel injection valve is nearly symmetrical relative to the central vertical plane of the cylinder in parallel with the direction of whirl of the tumbling flow and forms a plurality of nearly round shapes aligned in a partly arcuate shape being curved inward of the cylinder bore. Most of the injected fuel having the above sectional shape can be easily directed to one-fifth portion on the lower side of the cylinder bore wall on the exhaust valve side in the last stage of the intake stroke, and is used to favorably intensity the tumbling flow in a plurality of portions over a predetermined width with the central vertical plane of the cylinder as a center.

According to the direct fuel injection-type spark ignition internal combustion engine of the invention described in claim 17, in the direct fuel injection-type spark ignition internal combustion engine described in claim 12, the fuel injection valve has a plurality of round injection holes, and the horizontal sectional shape of the fuel injected from the fuel injection valve is nearly symmetrical relative to the central vertical plane of the cylinder in parallel with the direction of whirl of the tumbling flow and forms a plurality of nearly round shapes aligned like a line having a narrow angle not larger than 180° inward of the cylinder bore. Most of the injected fuel having the above sectional shape can be easily directed to one-fifth portion on the lower side of the cylinder bore wall on the exhaust valve side in the last stage of the intake stroke, and is used to favorably intensity the tumbling flow in a plurality of portions over a predetermined width with the central vertical plane of the cylinder as a center.

According to the direct fuel injection-type spark ignition internal combustion engine of the invention described in claim 18, in the direct fuel injection-type spark ignition internal combustion engine described in claim 12, the fuel injected from the fuel injection valve has such a piercing force that the end of fuel 1 ms after the start of injection reaches not less than 60 mm from the injection hole of the fuel injection valve, and has a Sauter mean diameter of not larger than 15 μm at a position 60 mm from the injection hole of the fuel injection valve 2 ms after the start of injection. The tumbling flow can be favorably intensified by the injected fuel of a large piercing force being finely atomized to push the tumbling flow over an increased area.

According to the direct fuel injection-type spark ignition internal combustion engine of the invention described in claim 19, in the direct fuel injection-type spark ignition internal combustion engine described in claim 18, the fuel injected from the fuel injection valve has such a piercing force that the end of fuel 1 ms after the start of injection reaches not less than 100 mm from the injection hole of the fuel injection valve, and has a Sauter mean diameter of not larger than 9 μm at a position 100 mm from the injection hole of the fuel injection valve 2 ms after the start of injection. The tumbling flow can be favorably intensified by the injected fuel of a large piercing force being finely atomized to push the tumbling flow over an increased area.

BEST MODE FOR CARRYING OUT THE INVENTION

Figure 1:
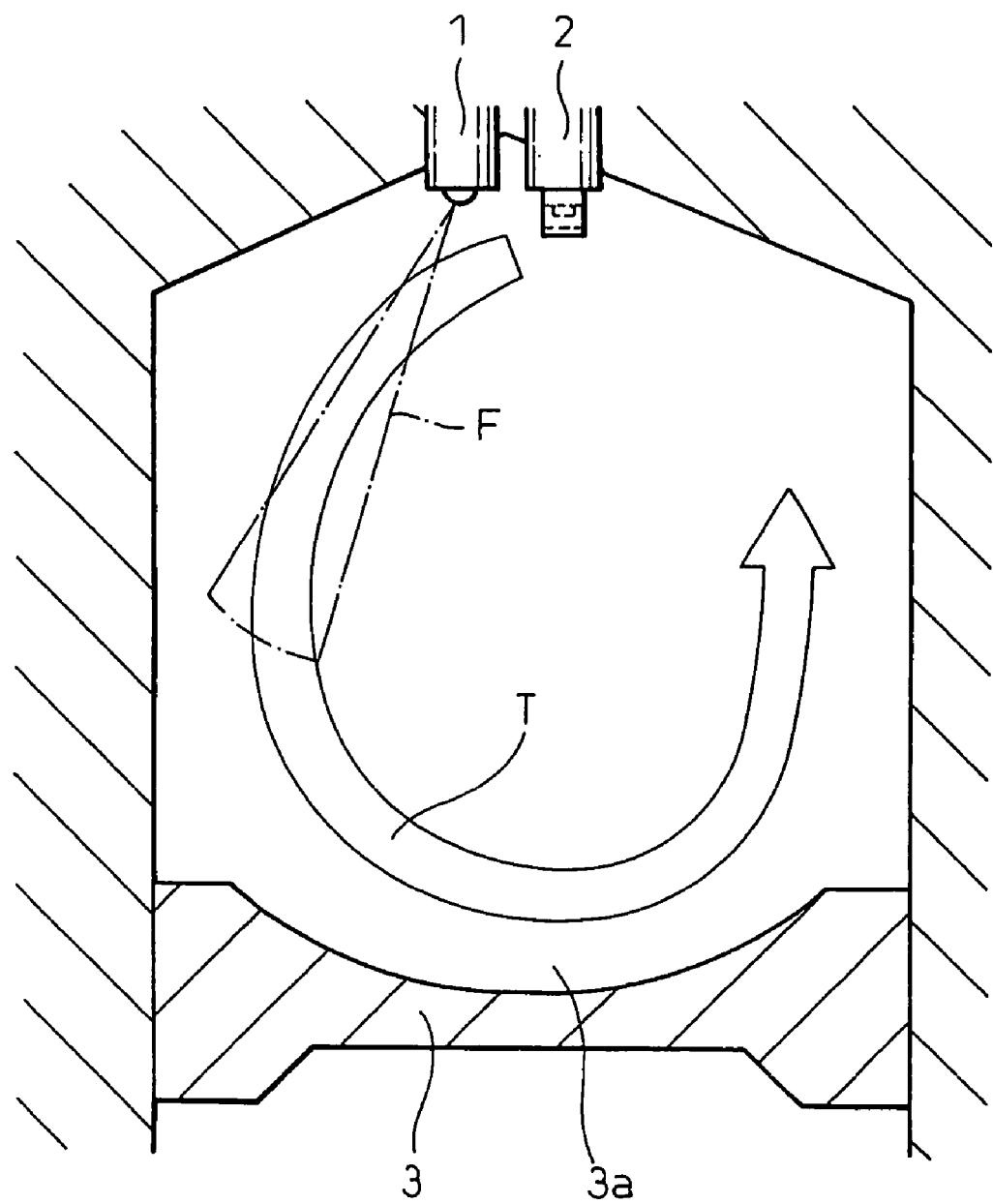
FIG. 1 is a vertical sectional view schematically illustrating an embodiment of a direct fuel injection-type spark ignition internal combustion engine according to the present invention.
Figure 2:
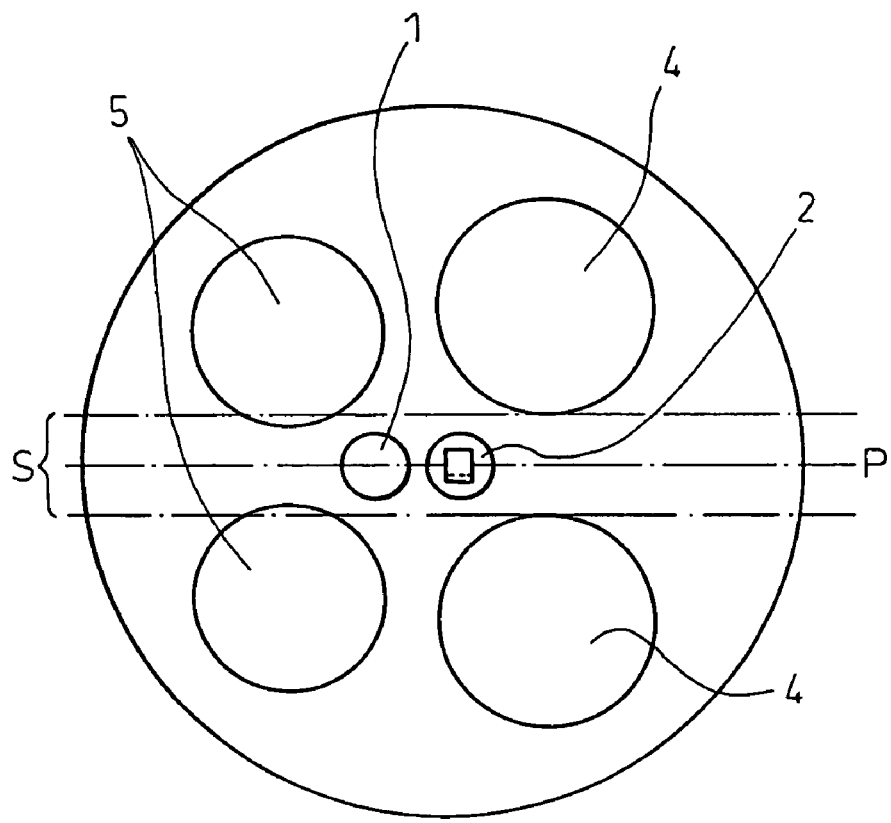
FIG. 2 is a bottom view of a cylinder head of FIG. 1.

FIG. 1 is a vertical sectional view schematically illustrating an embodiment of a direct fuel injection-type spark ignition internal combustion engine according to the present invention. FIG. 2 is a bottom view of a cylinder head of the direct fuel injection-type spark ignition internal combustion engine of FIG. 1. In these drawings, 1 is a fuel injection valve arranged nearly at the center in the upper part of the cylinder and injects the fuel directly into the cylinder, and 2 is an ignition plug arranged near the fuel injection valve 1. Reference numeral 3 denotes a piston, 4 denotes a pair of intake valves, and 5 denotes a pair of exhaust valves.

In the direct fuel injection-type spark ignition internal combustion engine, a homogeneous mixture leaner than the stoichiometric air-fuel ratio is formed in the cylinder, and the mixture is ignited by the ignition plug 2 and burns to execute the homogeneous combustion. During a high engine speed and high engine load operation where a large output is required, the homogeneous combustion may be executed at the stoichiometric air-fuel ratio or at a rich air-fuel ratio. In executing the homogeneous combustion at a lean air-fuel ratio in particular, a desired engine output is not obtained unless the combustion speed is increased by existence of the turbulence in the cylinder at the ignition timing. It is, therefore, desired to form, in the cylinder, a tumbling flow T that descends in the cylinder bore on the exhaust valve side and ascends on the intake valve side utilizing the intake air that is fed into the cylinder in the intake stroke and to sustain the tumbling flow T up to the ignition timing in the last stage of the compression stroke so that the turbulence exists in the cylinder at the ignition timing.

Unless the shape and arrangement of the intake port are contrived so as to increase the thickness of the cylinder head or an intake flow control valve is provided in the intake port, however, the tumbling flow that is formed in the cylinder is not, usually, so strong. Even by forming a cavity 3a of a partly arcuate shape in cross section in the top surface of the piston 3 to suppress the attenuation of the tumbling flow as in this embodiment, the tumbling flow attenuates during the compression stroke and easily extinguishes before the ignition timing; i.e., the turbulence based on the tumbling flow cannot exist in the cylinder at the ignition timing. In this embodiment, therefore, the tumbling flow T which is formed in the cylinder during the intake stroke but is not so strong is intensified by utilizing the piercing force of the fuel F injected from the fuel injection valve 1 toward the exhaust valve side in the cylinder bore in the last stage of the intake stroke. The thus intensified tumbling flow is favorably sustained up to the ignition timing in the last stage of the compression stroke to make the turbulence exist in the cylinder.

The spark plug 2 is arranged on the intake valve side away from the fuel injection valve 1 that injects the fuel toward the exhaust valve side of the cylinder bore. Therefore, the fuel injected from the fuel injection valve 1 does not come into direct collision with the ignition plug 2. Accordingly, the spark plug 2 is not wet with the fuel, and the occurrence of arc is not hindered.

In this embodiment, the fuel injection valve 1 has a slit-like injection hole, and injects the fuel in nearly the shape of a fan having a relatively small thickness, wherein the plane at the center of thickness of the fuel spray F is almost in agreement with a vertical plane P that passes through the center axis of the cylinder in parallel with the tumbling flow T. Therefore, the fuel F is injected into a space S in parallel with the vertical plane P between the two intake valves 4, travels, first, chiefly through the space S between the two intake valves 4 while whirling in the cylinder together with the tumbling flow T, and hardly deposits on the intake valves 4 that are opened. If the fuel deposits on the intake valves 4, the intake air amount often decreases. The above fuel injection into the space S, however, suppresses the deposition on the intake valves 4.

Figure 3:
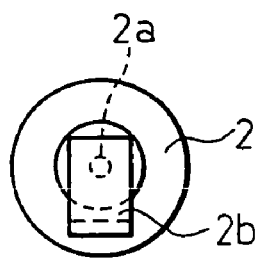
FIG. 3 is an enlarged view of an ignition plug of FIG. 2.

FIG. 3 is an enlarged view of the ignition plug 2 of FIG. 2. As shown, the ignition plug 2 has a center electrode 2a and an L-shaped plate electrode 2b. In this embodiment, the ignition plug 2 is so arranged that the direction of width of the plate electrode 2b is nearly in parallel with the tumbling flow. Therefore, the tumbling flow is suppressed from being attenuated by the collision with the plate electrode 2b that occurs when the direction of width of the plate electrode 2b faces the tumbling flow T (that occurs when the ignition plug is arranged being turned counterclockwise or clockwise by 90 degrees with respect to the ignition plug arrangement of FIG. 3).

In this ignition plug arrangement, the direction of thickness of the plate electrode 2b faces the tumbling flow T. However, the thickness of the plate electrode 2b is so small that the tumbling flow T is hardly attenuated. The same effect can be obtained not only from the ignition plug arrangement of FIG. 3 but also from the ignition plug arrangement that is turned by 180 degrees. Further, some ignition plugs may have two plate electrodes opposed to each other. In this case, too, it is desired that the direction of thickness of the two plate electrodes is opposed to the tumbling flow T, and the direction of width thereof is nearly in parallel with the tumbling flow.

Owing to the above-mentioned arrangement of the ignition plug 2, the arc that generates across the two electrodes 2a and 2b at the ignition timing is easily drawn by the tumbling flow T toward the downstream of the tumbling flow enabling the homogeneous mixture in the cylinder to be easily ignited. On the other hand, as the tumbling flow in the cylinder becomes stronger at the ignition timing, the arc is drawn and tends to be extinguished. It is desired to increase the ignition energy with an increase in the strength of the tumbling flow T in the cylinder at the ignition timing, i.e., with an increase in the tumbling flow T intensified by the fuel injection in the last stage of the intake stroke, so that the arc will not be extinguished even if the arc is drawn out. As the tumbling flow in the cylinder becomes strong at the ignition timing, further, the arc tends to be blown out by the tumbling flow. An increased ignition energy is effective in suppressing the blow-out by the tumbling flow.

In order to execute the homogeneous combustion at a desired air-fuel ratio, the fuel injection valve 1 injects the fuel of a required amount in the last stage of the intake stroke (for example, the crank angle for starting the fuel injection is set depending upon the amount of fuel injection in a manner that the crank angle for ending the fuel injection is near the bottom dead center in the intake stroke, or the crank angle for starting the fuel injection is set in the latter half of the intake stroke irrespective of the amount of fuel injection). Thus, the tumbling flow T is more intensified with an increase in the required amount of fuel.

However, if the tumbling flow is excessively intensified, the combustion speed excessively increases and, besides, the ignition energy must be increased, so that the arc will not be blown out by the tumbling flow or that the arc will not be extinguished. Therefore, it is not desired to unnecessarily intensify the tumbling flow. When the fuel is required in large amounts, therefore, part of the fuel may be injected in the intermediate stage or in the initial stage of the intake stroke (or may be injected being divided into a plurality of times) so that the fuel is injected in a decreased amount in the last stage of the intake stroke so as to control the degree of intensifying the tumbling flow T such that the tumbling flow T is not excessively intensified.

The direct fuel injection-type spark ignition internal combustion engine of this embodiment executes the homogeneous combustion relying upon the fuel that is directly injected into the cylinder and is, therefore, capable of reliably feeding the fuel of a required amount into the cylinder. On the other hand, in the case where the fuel is injected into the intake port, the fuel has to be injected in an amount in excess of the required amount to compensate for the deposition of fuel on the wall surface of the intake port. Further, the direct fuel injection-type spark ignition internal combustion engine may inject the fuel in the latter half of the compression stroke during, for example, the low engine load operation to execute the stratified charge combustion forming the mixture near only the ignition plug 2. In this case, the cavity 3a formed in the top surface of the piston 3 is deviated toward the side of the exhaust valves 4, and the injected fuel is collected by the cavity near the ignition plug 2.

In this embodiment, the fuel injection valve 1 injects fuel in nearly the shape of a fan having a relatively small thickness, which, however, is not to limit the invention, as a matter of course. The shape of the fuel spray can be arbitrarily set, for example, in a solid or hollow conical shape, or in a solid pole shape. Further, the fuel spray may be of an arcuate shape in cross section having a relatively small thickness or may be of the shape of a line in cross section by using an arcuate slit injection hole or a combination of a plurality of linear slit injection holes. The fuel spray may have a relatively large piercing force so as to accelerate the tumbling flow in the cylinder. Desirably, the fuel may be injected into the above-mentioned space between the two intake valves.

Figure 4:
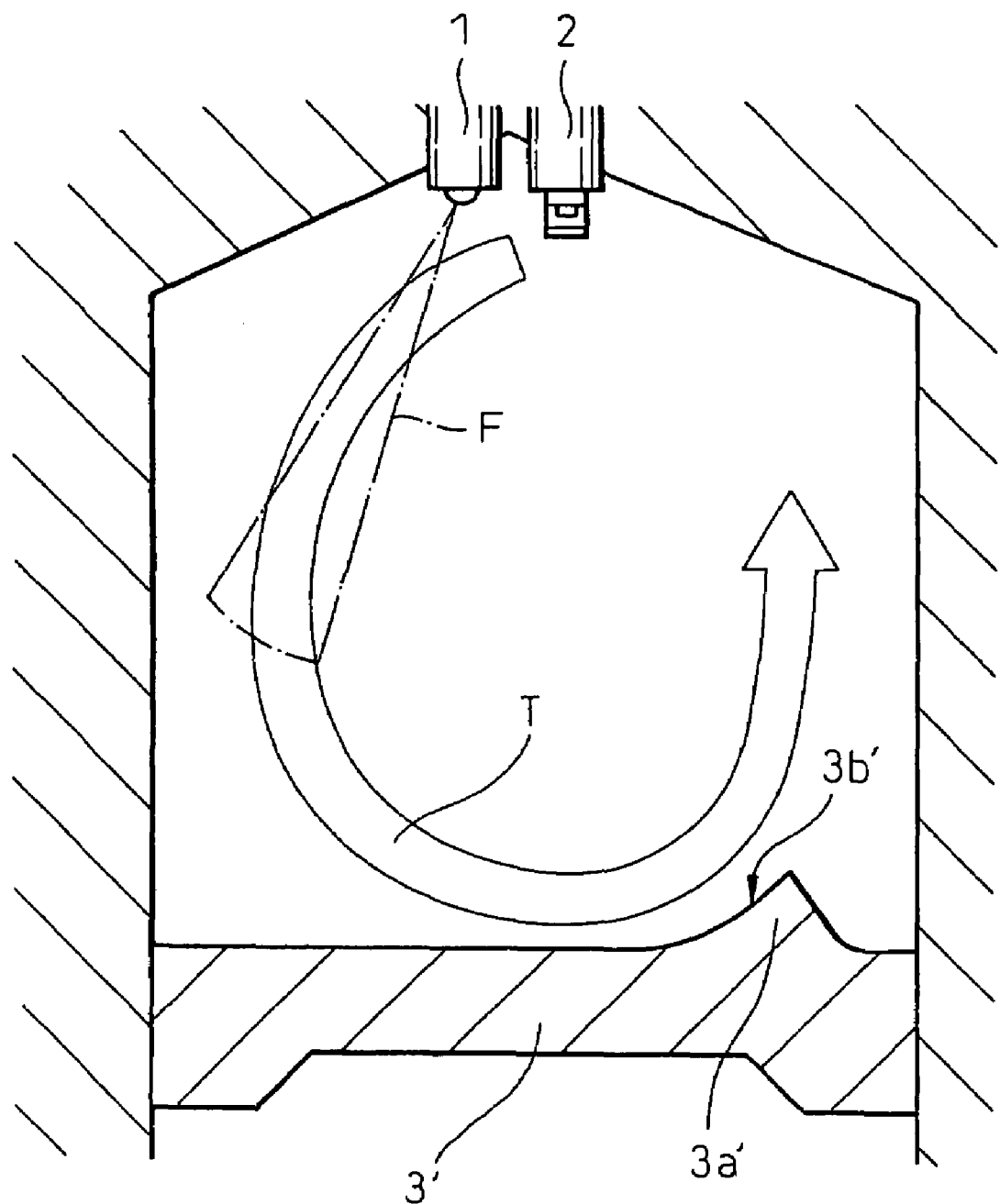
FIG. 4 is a schematic sectional view illustrating a modified example of the embodiment of FIG. 1 in the last stage of the intake stroke.

FIG. 4 is a schematic sectional view illustrating a modified example of the embodiment of FIG. 1. Described below are only the differences from the embodiment of FIG. 1. In the modified example, no cavity is formed in the top surface of the piston 3', and a protuberance 3a' is formed on the intake valve side. This enhances the compression ratio. A deflection surface 3b' continuing smoothly to the top surface of the piston 3' is formed on the exhaust valve side of the protuberance 3a'. The deflection surface 3b' shown in FIG. 4 is partly of an arcuate shape in cross section, which, however, may be of a linear shape. The tumbling flow T descending in the cylinder bore on the exhaust valve side and traveling along the top surface of the piston 3', is deflected by the deflection surface 3b' so as to ascend in the cylinder bore on the intake valve side. This suppresses the attenuation of the tumbling flow T as in the embodiment of FIG. 1, so as to easily sustain the tumbling flow up to the ignition timing.

Figure 5:
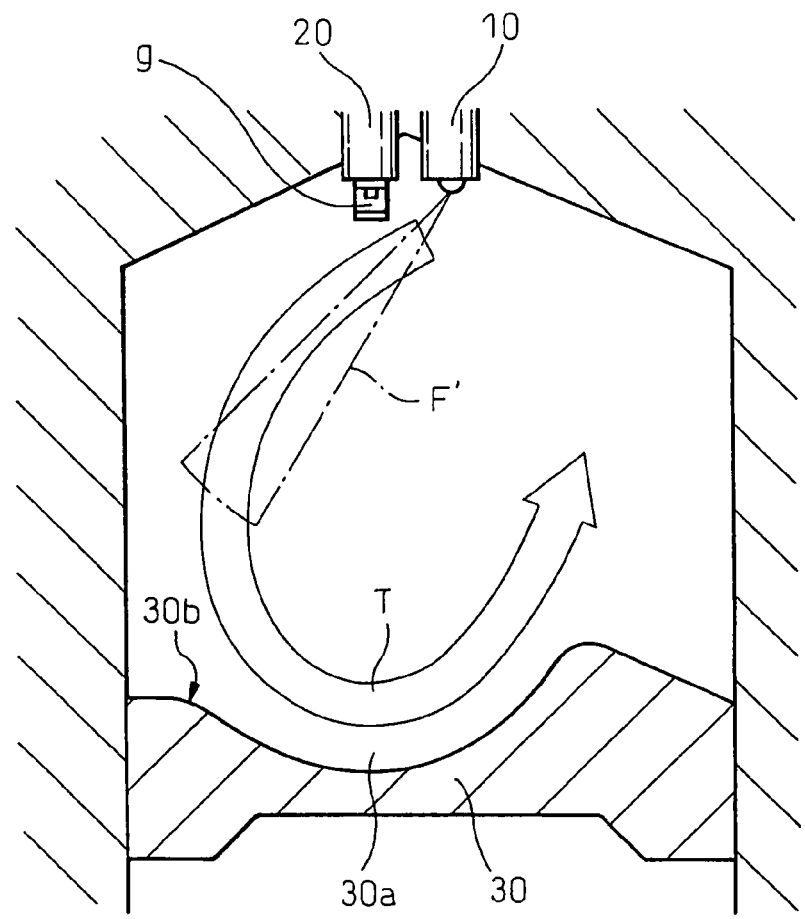
FIG. 5 is a schematic vertical sectional view illustrating another embodiment of the direct fuel injection-type spark ignition internal combustion engine according to the invention in the last stage of the intake stroke.

FIG. 5 is a schematic vertical sectional view illustrating another embodiment of the direct fuel injection-type spark ignition internal combustion engine according to the invention. Described below are only differences from the embodiment of FIG. 1. In this embodiment, too, a fuel injection valve 10 is arranged nearly at the center in the upper part of the cylinder to directly inject the fuel into the cylinder, and the tumbling flow T which is formed in the cylinder in the intake stroke is not so strong and is intensified as shown in FIG. 5 by utilizing the piercing force of the fuel F' injected toward the exhaust valve side of the cylinder bore from the fuel injection valve 10 in the last stage of the intake stroke. The thus intensified tumbling flow is favorably sustained up to the ignition period in the last stage of the compression stroke to make the turbulence present in the cylinder.

An ignition plug 20 is arranged on the exhaust valve side away from the fuel injection valve 10, and a cavity 30a is formed in the top surface of the piston 30 being deviated toward the exhaust valve side to suppress the attenuation of the tumbling flow. The exhaust valve side of the cavity 30a is smoothly continuous to the piston top surface through a fillet 30b to minimize the attenuation at the time when the tumbling flow enters into the cavity 30a. In other embodiments, too, it is desired that the above fillet is formed on the exhaust valve side of the cavity where the tumbling flow flows in.

Figure 6:
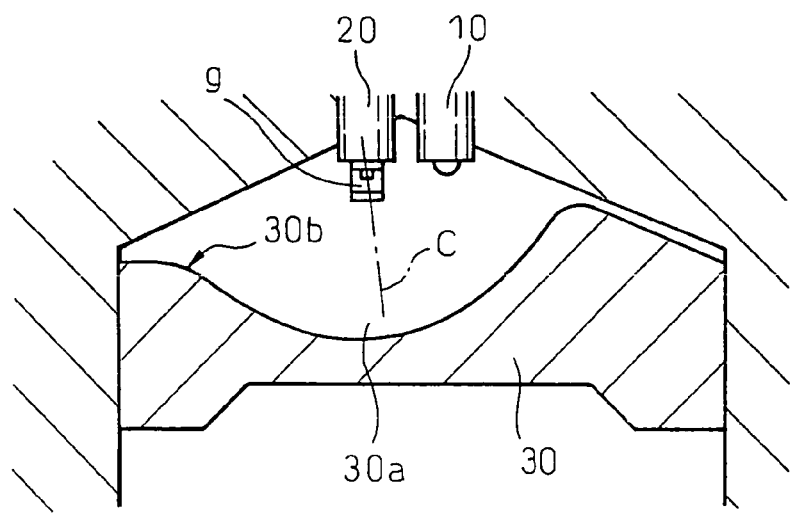
FIG. 6 is a schematic vertical sectional view of the embodiment of FIG. 5 at the ignition timing.

FIG. 6 is a schematic vertical sectional view of the embodiment at the ignition timing. As shown, the ignition gap g of the ignition plug 20 is positioned near the center axis c (which is not necessarily in parallel with the center axis of the cylinder bore but is tilted relative to the center axis of the cylinder bore in this embodiment) of the cavity 30a. Therefore, the mixture in the cavity starts burning from near the center thereof due to the arc generated in the ignition gap g of the ignition plug 20, the flame thereof radially propagates to the outer periphery thereof and, finally, the outer periphery burns nearly simultaneously. Therefore, the two-dimensional flame propagation distance until the completion of combustion becomes short, and the combustion speed increases.

The shape of the cavity 30a can be arbitrarily selected if it has a smooth sectional shape (e.g., partly arcuate shape in cross section) suppressing the attenuation of the tumbling flow. Desirably, the cavity 30a has partly spherical shape with the ignition gap g of the ignition plug 20 nearly as the center at the ignition timing. Therefore, the arc that generates at the ignition gap g of the ignition plug 20 propagates three-dimensionally and radially to the mixture in the cavity 30a and, finally, the portions near the wall surface of the cavity 30a burns simultaneously and completely. This shortens the nearly practically three-dimensional flame propagation distance until the completion of combustion and, further, increases the combustion speed.

Figure 7:
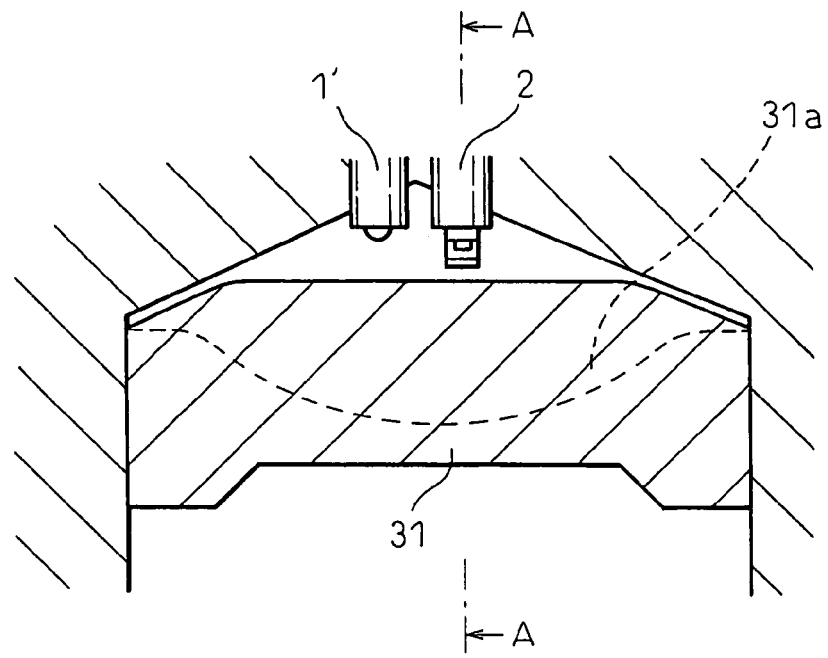
FIG. 7 is a schematic vertical sectional view illustrating a further embodiment of the direct fuel injection-type spark ignition internal combustion engine according to the invention at the ignition timing.
Figure 8:
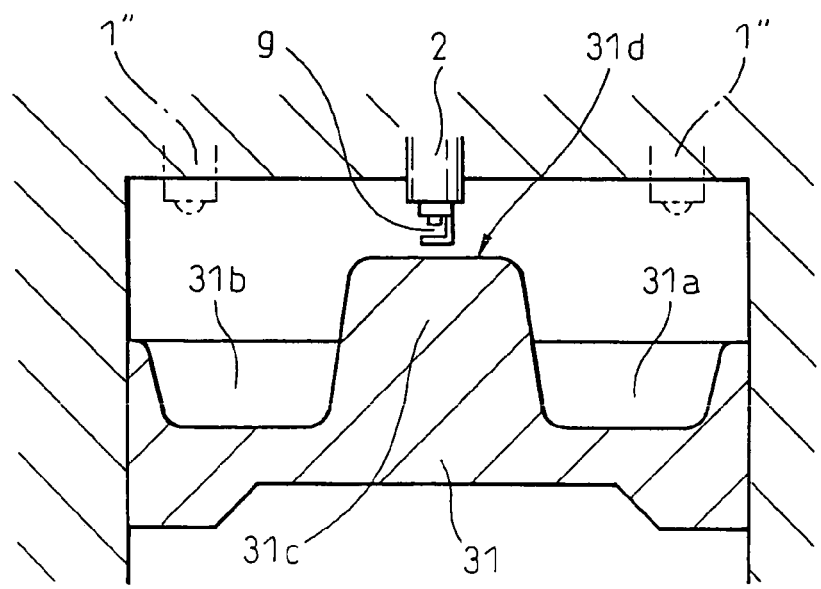
FIG. 8 is a sectional view along A-A in FIG. 7.

FIG. 7 is a schematic vertical sectional view illustrating a further embodiment of the direct fuel injection-type spark ignition internal combustion engine according to the invention at the ignition timing, and FIG. 8 is a sectional view along A-A in FIG. 7. Described below are only the differences from the embodiment of FIG. 1. This embodiment is of the two intake valve type like the embodiment of FIG. 1. In this case, two tumbling flows in parallel with each other are, first, formed in the cylinder via two intake valves.

In the embodiment of FIG. 1, these two tumbling flows readily combine to form a single tumbling flow. In this embodiment, however, the two tumbling flows whirl in parallel with each other in the cylinder descending in the cylinder bore on the exhaust valve side and ascending in the cylinder bore on the intake valve side and are respectively, intensified by the fuel injected in two directions toward the exhaust valve side of the cylinder bore from the fuel injection valve 1' in the last stage of the intake stroke, and two cavities 31a and 31b of partly arcuate shape in cross section are formed in the top surface of the piston 31, which cavities correspond to the respective tumbling flows. Therefore, the two tumbling flows are sustained up to the ignition period so that turbulence is present in the respective cavities 31a and 31b and in spaces over the cavities 31a and 31b. To intensify the two tumbling flows by the injection of fuel in the last stage of the intake stroke, two fuel injection valves 1" may be arranged between the intake valves and the exhaust valves in the periphery of upper part of the cylinder as indicated by dot-dash chain lines in FIG. 8; i.e., the two tumbling flows are intensified by the fuel injected toward the exhaust valve side of the cylinder bore from the fuel injection valves 1", which fuel injections correspond to the tumbling flows in the last stage of the intake stroke.

In the embodiment, a bulging portion 31c is formed on the top surface of the piston 31 between the two cavities 31a and 31b, and the ignition gap g of the ignition plug 2 arranged nearly at the center in the upper part of the cylinder faces the top surface 31d of the bulging portion 31c. The bulging portion 31c works to increase the compression ratio enabling the engine output to increase, the mixture in the cylinder starts slowly burning from a relatively narrow space between the ignition plug 2 and the top surface 31d of the bulging portion 31c due to the arc generated in the ignition gap g of the ignition plug 2, and the flame thereof propagates into the cavities 31a and 31b on both sides of the bulging portion 31c finally triggering a rapid combustion, producing little knocking.

Figure 9:
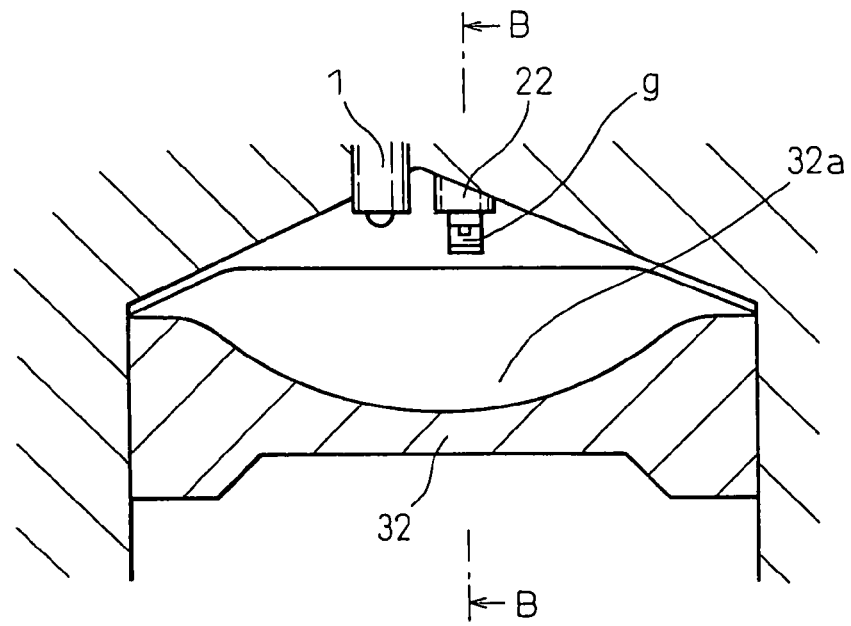
FIG. 9 is a schematic vertical sectional view illustrating a still further embodiment of the direct fuel injection-type spark ignition internal combustion engine according to the invention at the ignition timing.
Figure 10:
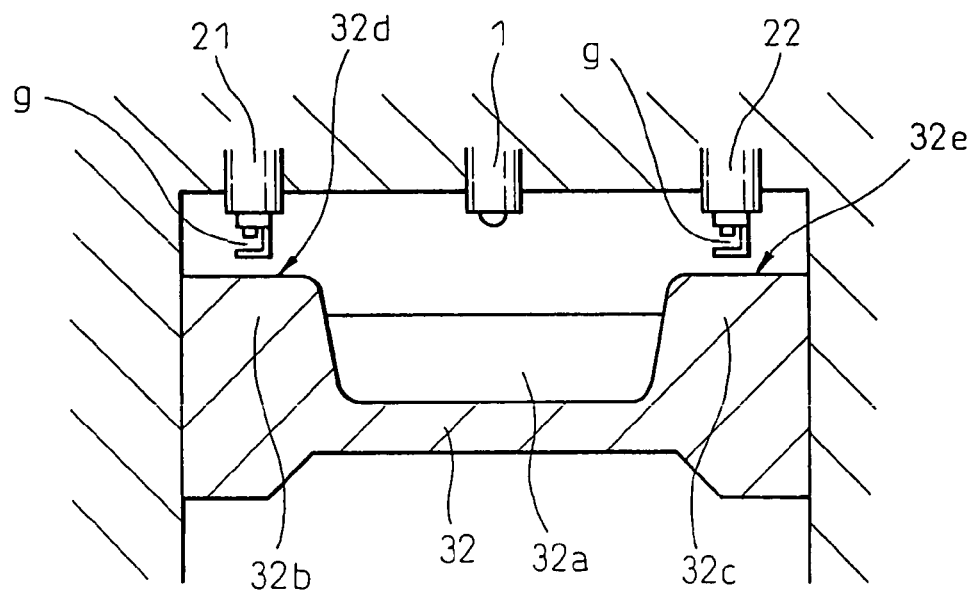
FIG. 10 is a sectional view along B-B in FIG. 9.

FIG. 9 is a schematic vertical sectional view illustrating a still further embodiment of the direct fuel injection-type spark ignition internal combustion engine according to the invention at the ignition timing, and FIG. 10 is a sectional view along B-B in FIG. 9. Described below are only the differences from the embodiment of FIG. 1. In this embodiment as in the embodiment of FIG. 1, a tumbling flow that descends in the cylinder bore on the exhaust valve side and ascends in the cylinder bore on the intake valve side, is intensified by the fuel injected from the fuel injection valve 1 toward the exhaust valve side of the cylinder bore in the last stage of the intake stroke, and attenuation of the tumbling flow is suppressed by the cavity 32a of a partly arcuate shape in cross section formed in the top surface of the piston 32, so that the tumbling flow is sustained up to the ignition period and that the turbulence is present in the cylinder.

In the embodiment, the bulging portions 32b and 32c are formed on the top surface of the piston 32 on both sides of the cavity 32a. In the embodiment, further, two ignition plugs 21 and 22 are arranged between the intake valves and the exhaust valves in the periphery of the upper part of the cylinder, and ignition gaps g of the two ignition plugs 21 and 22 are facing the top surfaces 32d and 32e of the two bulging portions 32b and 32c, respectively. Namely, the two bulging portions 32b and 32c work to increase the compression ratio enabling the engine output to increase, the mixture in the cylinder starts slowly burning from two relatively narrow spaces between the ignition plugs 21, 22 and the top surfaces 32d, 32e of the bulging portions 32b, 32c due to the arc generated in the ignition gaps g of the ignition plugs 21, 22, and the two flames thereof propagate into the cavity 32a between the two bulging portions 32a and 32c finally triggering a very rapid combustion, increasing the combustion speed and producing little knocking.

The disturbance in the cylinder due to the tumbling flow not only makes it possible to obtain a lean air-fuel ratio but also to improve the combustion by increasing the combustion speed even in the homogeneous combustion at the stochiometric air-fuel ratio or at a rich air-fuel ratio. Therefore, if the tumbling flow can be intensified by injecting the fuel as described above, then no intake flow control valve is necessary and the engine intake system does not become complex.

Figure 11:
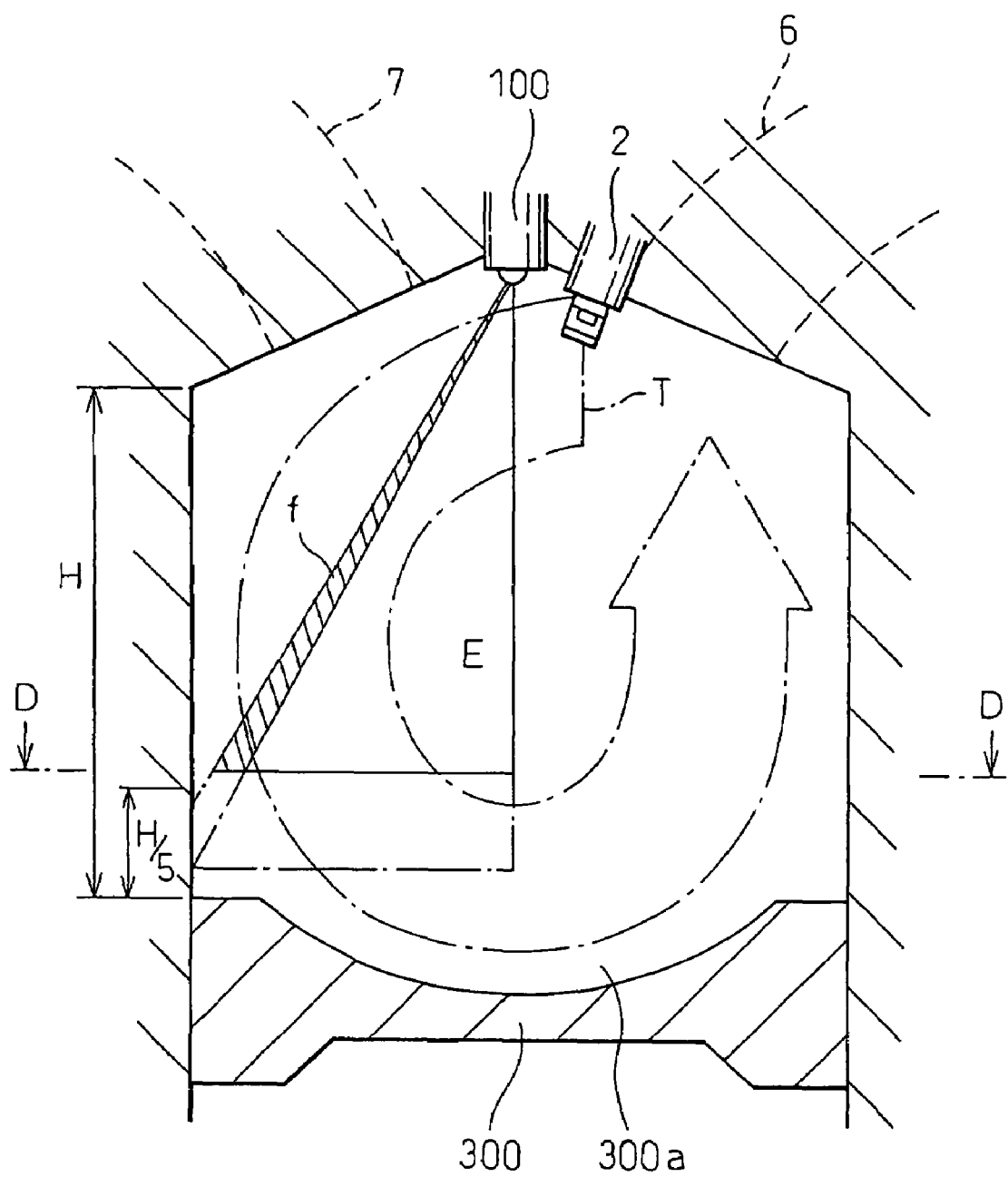
FIG. 11 is a schematic vertical sectional view illustrating a yet further embodiment of the direct fuel injection-type spark ignition internal combustion engine according to the invention in the last stage of the intake stroke.

FIG. 11 is a schematic vertical sectional view illustrating a yet further embodiment of the direct cylinder fuel injection-type spark ignition internal combustion engine according to the invention in the last stage of the intake stroke. In FIG. 11, reference numeral 100 denotes a fuel injection valve arranged nearly at the center in the upper part of the cylinder, and 2 is an ignition plug arranged near the intake valve side from the fuel injection valve 100 and is directed in the same manner as that of the above embodiments. Reference numeral 6 denotes an intake port communicated with the cylinder via a pair of intake valves (not shown), and 7 denotes an exhaust port communicated with the cylinder via a pair of exhaust valves (not shown). Reference numeral 300 denotes a piston.

Figure 12:
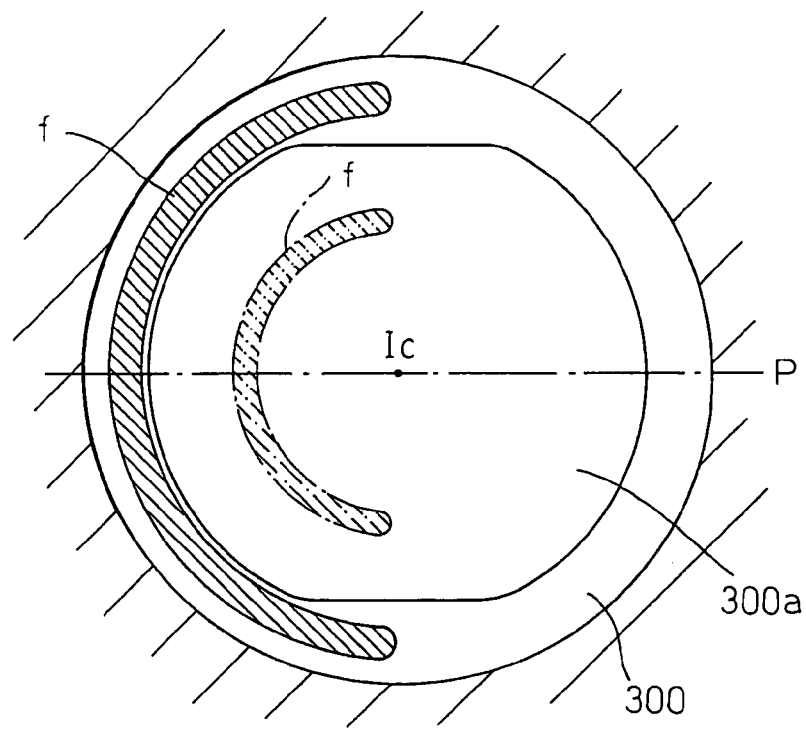
FIG. 12 is a sectional view along D-D in FIG. 11.

FIG. 12 is a sectional view along D-D in FIG. 11. Referring to FIGS. 11 and 12, a cavity 300a is formed in the top surface of the piston 300 for suppressing the attenuation of the tumbling flow T that whirls in the cylinder in the vertical direction descending in the cylinder bore along the exhaust valve side and ascending along the intake valve side, the cavity 300a having an arcuate shape in cross section in parallel with the direction in which the tumbling flow T whirls. In FIG. 12, Ic represents the center position of the fuel injection valve 100.

The fuel injection valve 100 has a slit injection hole of a partly arcuate shape. The fuel f injected from the fuel injection valve 100 in the last stage of the intake stroke has a horizontal sectional shape which, as represented by solid lines in FIG. 12, is nearly symmetrical relative to the vertical plane P at the center of the cylinder passing through the center axis of the cylinder in parallel with the direction in which the tumbling flow T whirls, and is a partly arcuate shape being curved inward of the cylinder bore. Dot-dash chain lines in FIG. 12 represent a horizontal sectional shape of the injected fuel f on the side of the fuel injection valve from the D-D section of FIG. 11. As also shown in FIG. 11, the thickness of the injected fuel f gradually increases as it goes away from the fuel injection valve 100. Here, the horizontal direction is a direction perpendicular to the axis of the cylinder and the vertical direction is a direction in parallel with the axis of the cylinder. In this embodiment, the partly arcuate shape is, particularly, a semi-arcuate shape. Most of the injected fuel f having the above sectional shape can be directed a particular range of height of the cylinder bore wall of the exhaust valve side.

In the present embodiment and the above-mentioned embodiments, the fuel injected aslant and downward toward the exhaust valve side of the cylinder bore from the fuel injection valve arranged nearly at the center in the upper part of the cylinder has a piercing force that works to reinforce the tumbling flow T that travels aslant and downward along the pent roof-type cylinder head on the exhaust valve side thereof and to reinforce the tumbling flow that descends down vertically along the cylinder bore due to the vertical component of the piercing force.

Figure 16:
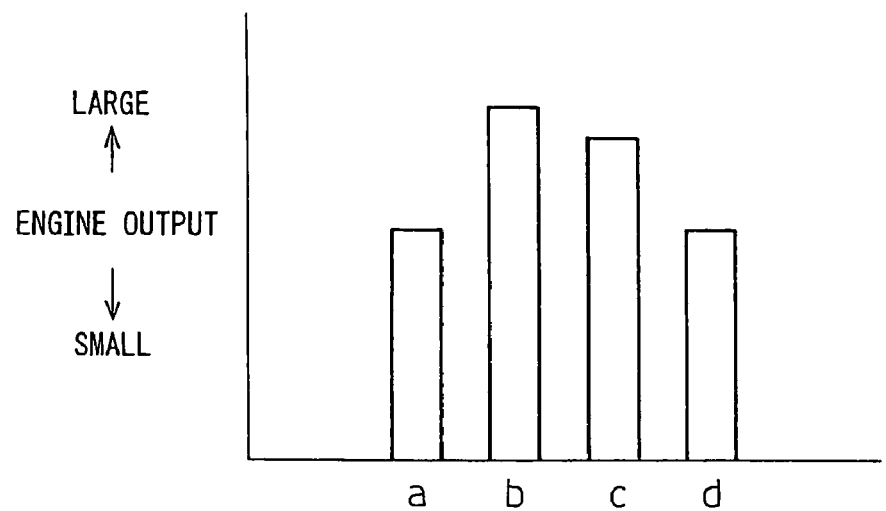
FIG. 16 is a graph illustrating a change in the engine output relative to the direction of fuel injection.

FIG. 16 is a graph illustrating a change in the engine output while changing the direction of injecting the fuel having a semi-arcuate shape in cross section according to the embodiment. In FIG. 16, (a) represents a case where the injection is directed to the top surface of the piston near the cylinder bore wall on the exhaust valve side in the last stage of the intake stroke, (b) represents a case where the injection is directed to the one-fifth portion on the lower side of the cylinder bore wall height (H) on the exhaust valve side in the last stage of the intake stroke, (c) represents a case where the injection is directed to the one-third portion on the lower side excluding the one-fifth portion on the lower side (i.e., a range from H/5 on the lower side to H/3 on the lower side) of the cylinder bore wall height (H) on the exhaust valve side in the last stage of the intake stroke, and (d) represents a case where the injection is directed to the 4.5/10 portion on the lower side excluding the one-third portion on the lower side (i.e., a range from H/3 on the lower side to 4.5 H/10 on the lower side) of the cylinder bore on the exhaust valve side in the last stage of the intake stroke.

Though the injected fuel has the same piercing force in all directions of injection, as shown in FIG. 16, differences occur in the engine output obtained depending upon the directions of injection, and the greatest engine output is produced in the direction (b) of injection. Namely, it is considered that the tumbling flow T is intensified most efficiently in the direction (b) of injection. In order for the injected fuel to more efficiently intensify the tumbling flow, it is desired that the injected fuel travels over a long distance in the cylinder and continues to intensify the tumbling flow T while traveling. In the direction (d) of injection, on the other hand, the injected fuel comes into collision with the cylinder bore relatively quickly and cannot efficiently intensify the tumbling flow T. In the direction (a) of injection, the injected fuel travels over a long distance in the cylinder. In this case, however, the injected fuel separates away from the cylinder bore and partly passes through a stagnating space E on the inside of the tumbling flow T or passes through near the stagnating space E, and cannot efficiently intensify the tumbling flow T.

Figure 17:
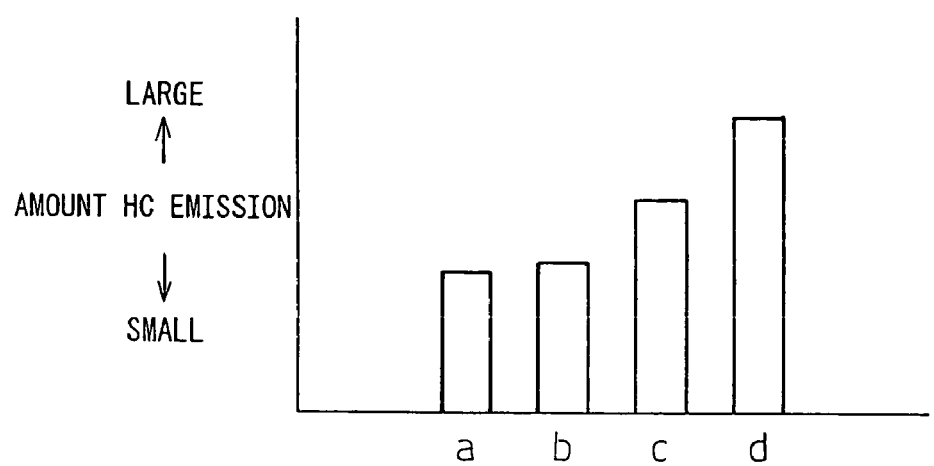
FIG. 17 is a graph illustrating a change in the amount of HC emission relative to the direction of fuel injection.

FIG. 17 is a graph illustrating a change in the amount of HC emission depending upon the directions of injection. In the directions (a) and (b) of injection as shown, the injected fuel travels over a long distance in the cylinder, vaporizes prior to arriving at the top surface of the piston or the cylinder bore, and hardly deposits on the top surface of the piston or on the cylinder bore. Namely, it hardly happens that the deposited fuel is vaporized in the expansion stroke causing an increase in the amount of emission of unburned HC. On the other hand, the fuel injected in the direction (d) of injection arrives at the cylinder bore after having traveled over a relatively short distance in the cylinder and, therefore, deposits on the cylinder bore in a relatively large amount without being vaporized. The fuel that is deposited vaporizes in the expansion stroke causing an increase in the amount of emission of unburned HC. In the direction (c) of injection, too, the fuel travels over a distance longer than the distance in the direction (d) of injection but travels over a distance shorter than the distance in the direction (b) of injection. Therefore, the fuel deposits on the cylinder bore to some extent still causing an increase in the amount of emission of the unburned HC.

Upon injecting most part of the fuel from the fuel injection valve 100 onto the band-like portion over a range of ⅕ (H/5) of the lower side of the cylinder bore wall on the exhaust valve side (band-like portion in the cylindrical band-like portion ⅕ of the lower side of the cylinder bore wall on the exhaust valve side from the fuel injection valve 100) in the last stage of the intake stroke, the tumbling flow T can be favorably intensified, the injected fuel is suppressed from depositing on the cylinder bore, the engine oil is hardly diluted, and there is almost no increase in the amount of unburned fuel in the exhaust gas that stems from the vaporization of the deposited fuel.

In this embodiment, further, the fuel injected from the fuel injection valve arranged nearly at the center in the upper part of the cylinder has a partly arcuate shape in horizontal cross section nearly symmetrical relative to the central vertical plane P of the cylinder making it possible to favorably intensify the tumbling flow T over a predetermined width with the central vertical plane P of the cylinder as a center. Further, since the partly arcuate shape is a semi-arcuate shape, the tumbling flow T can be favorably intensified over the whole width.

Figure 13:
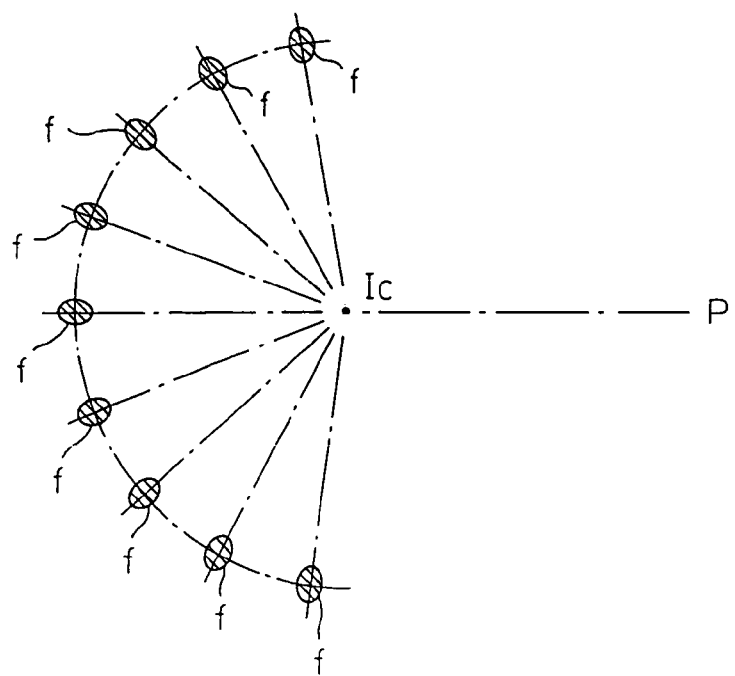
FIG. 13 is a view illustrating a modified example of the shape of the injected fuel of FIGS. 11 and 12.

FIG. 13 is a horizontal sectional view illustrating a modified example of the shape of the injected fuel of FIGS. 11 and 12. In this modified example, the fuel injection valve has a plurality of round injection holes, and the horizontal sectional shape of the fuel injected from the fuel injection valve is of a partly arcuate shape nearly symmetrical relative to the central vertical plane P of the cylinder in parallel with the direction in which the tumbling flow whirls as shown in FIG. 13 and forms a plurality of nearly round shapes aligned partly arcuately being curved inward of the cylinder bore. The fuel f injected from the round injection holes forms a solid conical shape which slightly flares downward and aslant. In a horizontal cross section, therefore, the solid conical shape is traversed aslant and, strictly speaking, the round shapes become elliptical shapes having a long axis radially extending from the center Ic of the fuel injection valve.

Most of the thus injected fuel can be easily directed to the ⅕ portion on the lower side of the cylinder bore wall on the exhaust valve side in the last stage of the intake stroke like the injected fuel having a partly arcuate shape in cross section. Further, the tumbling flow T can be preferably intensified at a plurality of portions thereof over a predetermined width with the central vertical plane of the cylinder as a center.

Figure 14:
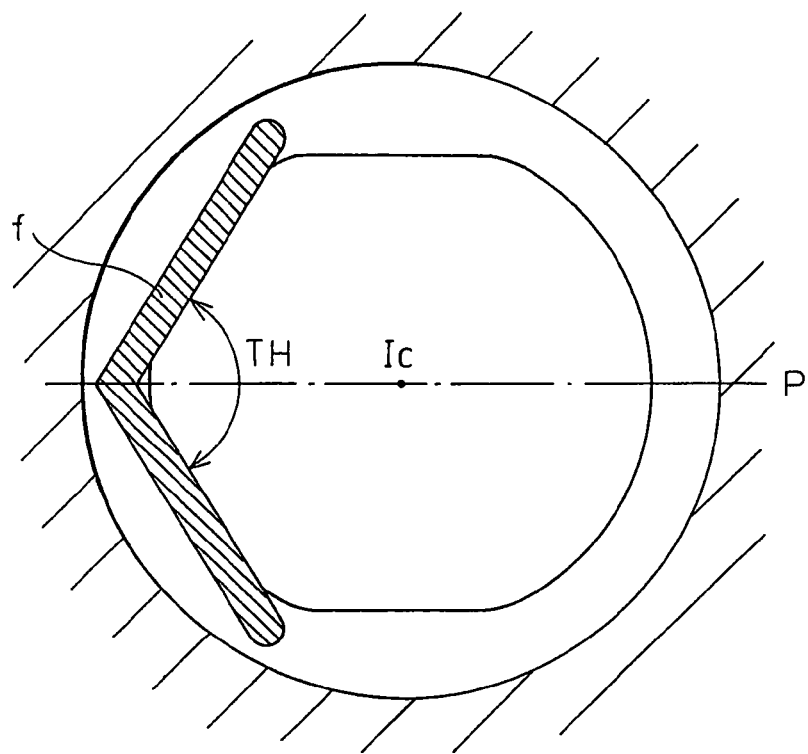
FIG. 14 is another sectional view along D-D in FIG. 11.

FIG. 14 is a sectional view which corresponds to FIG. 12 and illustrates another shape of the injected fuel. The fuel injection valve for injecting the fuel of this shape has a slit injection hole of the shape of a line, and the injected fuel has a horizontal sectional shape of a line which is nearly symmetrical relative to the central vertical plane P of the cylinder and has a contained angle TH smaller than 180° inward of the cylinder bore. Most of the injected fuel having the above sectional shape can also be easily directed to the ⅕ portion on the lower side of the cylinder bore wall on the exhaust valve side in the last stage of the intake stroke. Further, the tumbling flow T can be preferably intensified over a predetermined width with the central vertical plane of the cylinder as a center.

Figure 15:
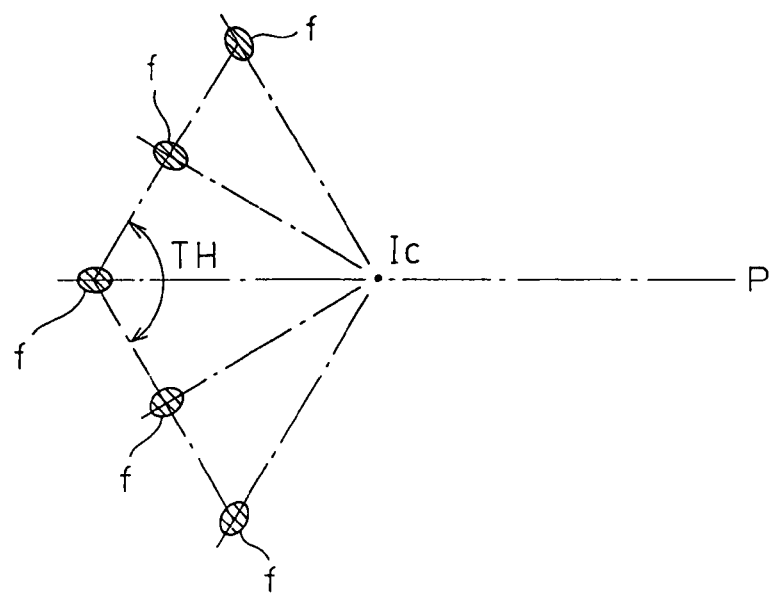
FIG. 15 is a view illustrating a modified example of the shape of the injected fuel of FIG. 14.

FIG. 15 is a horizontal sectional view illustrating a modified example of the shape of the injected fuel of FIG. 14. In this embodiment, the fuel injection valve has a plurality of round injection holes, and the fuel injected from the fuel injection valve has a horizontal sectional shape which is a line nearly symmetrical relative to the central vertical plane P of the cylinder as shown in FIG. 15, and forms a plurality of nearly round shapes (strictly, elliptical shapes as described above) aligned like a line having a contained angle TH smaller than 180° inward of the cylinder bore. Most of the injected fuel having the above sectional shape can also be easily directed to the ⅕ portion on the lower side of the cylinder bore wall on the exhaust valve side in the last stage of the intake stroke. Further, the tumbling flow T can be preferably intensified at a plurality of portions thereof over a predetermined width with the central vertical plane of the cylinder as a center.

Here, to favorably intensify the tumbling flow T by the injected fuel as described above, it is desired that the piercing force of the injected fuel is as strong as possible. It is further desired that the injected fuel is finely atomized to a sufficient degree while it travels increasing the area that pushes the tumbling flow T. It is desired that the injected fuel for favorably intensifying the tumbling flow T has such a piercing force that the end of fuel 1 ms after the start of injection reaches not less than 60 mm from the injection hole of the fuel injection valve, and has a Sauter mean diameter of not larger than 15 μm at a position 60 mm from the injection hole of the fuel injection valve 2 ms after the start of injection.

Further, the injected fuel for further favorably intensifying the tumbling flow T has such a piercing force that the end of fuel 1 ms after the start of injection reaches not less than 100 mm from the injection hole of the fuel injection valve, and has a Sauter mean diameter of not larger than 9 μm at a position 100 mm from the injection hole of the fuel injection valve 2 ms after the start of injection.

The invention claimed is:

1. A direct fuel injection-type spark ignition internal combustion engine comprising:
a fuel injection valve arranged at or nearly at the center in an upper part of a cylinder, and
an ignition plug arranged at the upper part of the cylinder,
wherein the fuel injection valve is configured to direct most of an injected fuel to a one-fifth portion on a lower side of a cylinder bore wall on an exhaust valve side in a last stage of an intake stroke, so that a tumbling flow that whirls in the cylinder descending in a cylinder bore on the exhaust valve side and ascending in the cylinder bore on an intake valve side is intensified by the fuel that is injected from the fuel injection valve toward the exhaust valve side in the cylinder bore in the last stage of the intake stroke.

2. The direct fuel injection-type spark ignition internal combustion engine according to claim 1, wherein said fuel injection valve has a slit injection hole of a partly arcuate shape, and a horizontal sectional shape of the fuel injected from said fuel injection valve is nearly symmetrical relative to a central vertical plane of the cylinder in parallel with a direction of whirl of said tumbling flow and is a partly arcuate shape being curved inward of the cylinder bore.

3. The direct fuel injection-type spark ignition internal combustion engine according to claim 2, wherein said partly arcuate shape is a semi-arcuate shape.

4. The direct fuel injection-type spark ignition internal combustion engine according to claim 1, wherein said fuel injection valve has a slit injection hole in a shape of a line, and a horizontal sectional shape of the fuel injected from said fuel injection valve is nearly symmetrical relative to a central vertical plane of the cylinder in parallel with a direction of whirl of said tumbling flow and is of the shape of a line having a contained angle not larger than 180° inward of the cylinder bore.

5. The direct fuel injection-type spark ignition internal combustion engine according to claim 1, wherein said fuel injection valve has a plurality of round injection holes, and a horizontal sectional shape of the fuel injected from said fuel injection valve is nearly symmetrical relative to a central vertical plane of the cylinder in parallel with a direction of whirl of said tumbling flow and forms a plurality of nearly round shapes aligned in a partly arcuate shape being curved inward of the cylinder bore.

6. The direct fuel injection-type spark ignition internal combustion engine according to claim 1, wherein said fuel injection valve has a plurality of round injection holes, and a horizontal sectional shape of the fuel injected from said fuel injection valve is nearly symmetrical relative to a central vertical plane of the cylinder in parallel with a direction of whirl of said tumbling flow and forms a plurality of nearly round shapes aligned like a line having a contained angle not larger than 180° inward of the cylinder bore.

7. The direct fuel injection-type spark ignition internal combustion engine according to claim 1, wherein the fuel injected from said fuel injection valve has such a piercing force that an end of fuel 1 ms after a start of injection reaches not less than 60 mm from an injection hole of said fuel injection valve, and has a Sauter mean diameter of not larger than 15 μm at a position 60 mm from the injection hole of said fuel injection valve 2 ms after the start of injection.

8. The direct fuel injection-type spark ignition internal combustion engine according to claim 7, wherein the fuel injected from said fuel injection valve has such a piercing force that the end of fuel 1 ms after the start of injection reaches not less than 100 mm from the injection hole of said fuel injection valve, and has a Sauter mean diameter of not larger than 9 μm at a position 100 mm from the injection hole of said fuel injection valve 2 ms after the start of injection.

9. A direct fuel injection-type spark ignition internal combustion engine comprising:
a fuel injection valve arranged at or nearly at the center in an upper part of a cylinder, and
an ignition plug arranged at the upper part of the cylinder, wherein:
the fuel injection valve is configured to direct most of an injected fuel to a one-fifth portion on a lower side of a cylinder bore wall on an exhaust valve side in a last stage of an intake stroke, so that a tumbling flow that whirls in the cylinder descending in a cylinder bore on the exhaust valve side and ascending in the cylinder bore on an intake valve side, is intensified by the fuel that is injected from the fuel injection valve toward the exhaust valve side in the cylinder bore in the last stage of the intake stroke, and
a cavity formed in a top surface of the piston is configured to suppress attenuation of the tumbling flow.

* * * * *